Nov. 6, 1945.　　　G. M. NELSEN　　　2,388,493
OPHTHALMIC DEVICE
Filed April 29, 1944　　　4 Sheets-Sheet 1
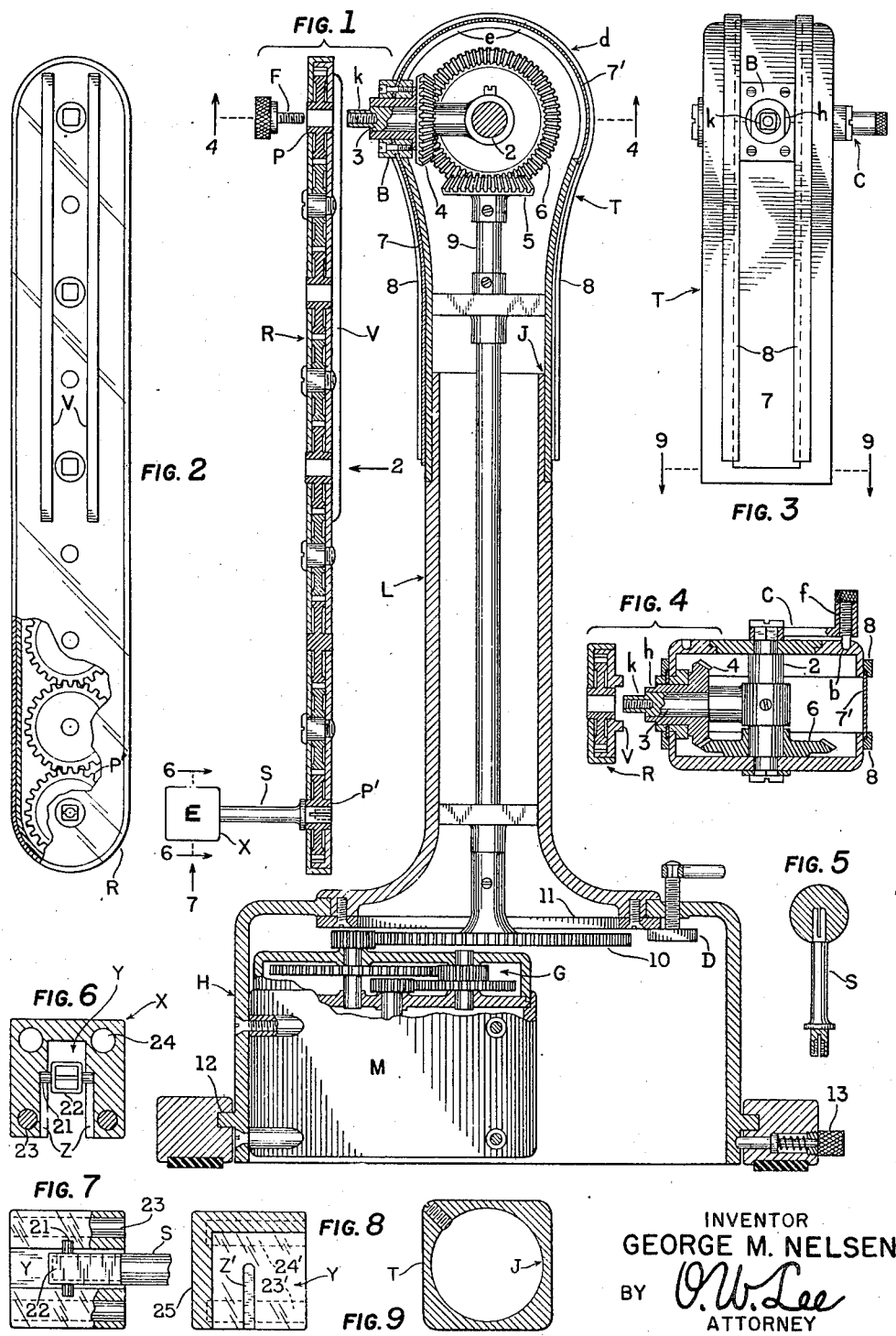
INVENTOR
GEORGE M. NELSEN
BY O. W. Lee
ATTORNEY

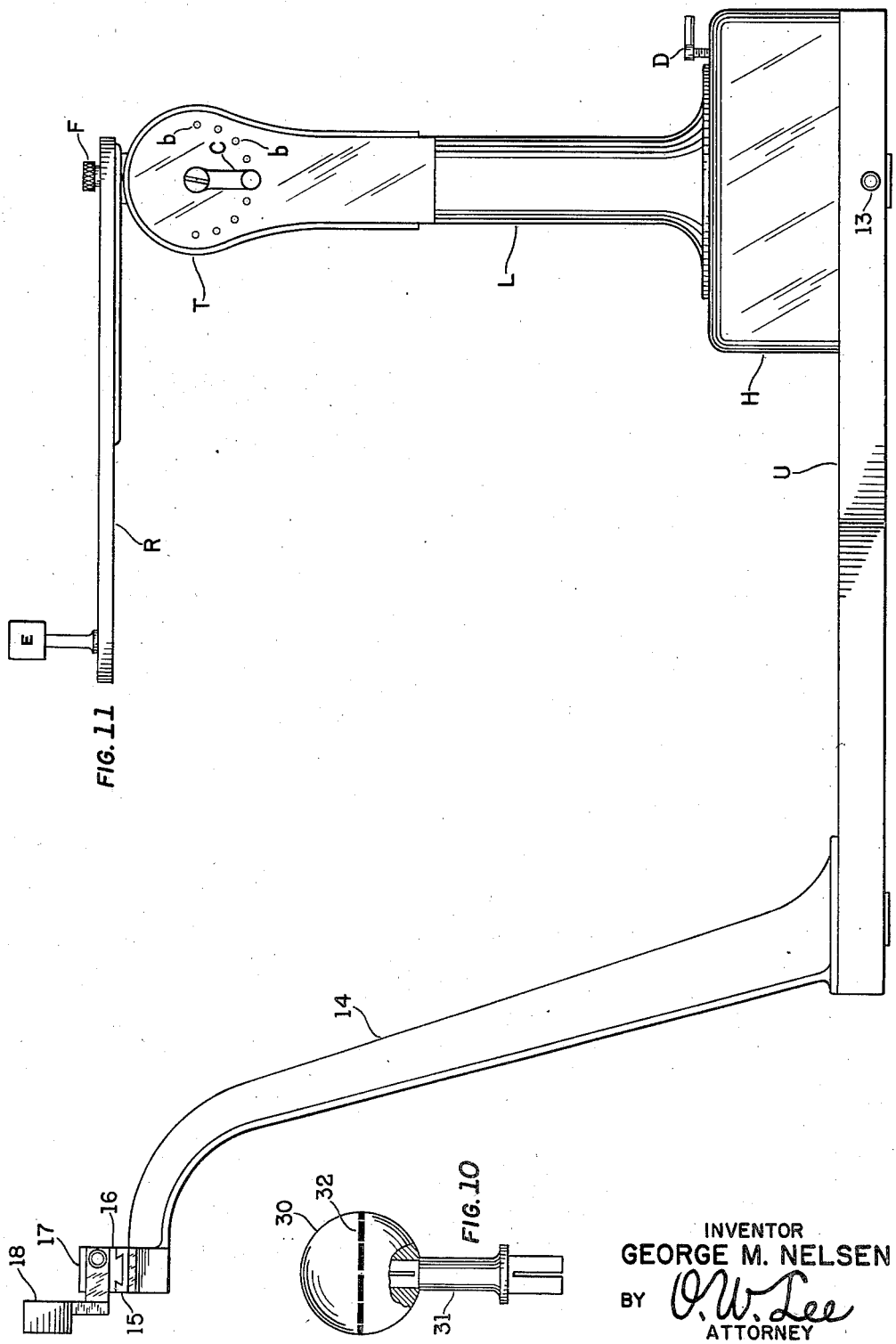

Nov. 6, 1945. G. M. NELSEN 2,388,493
OPHTHALMIC DEVICE
Filed April 29, 1944 4 Sheets-Sheet 3
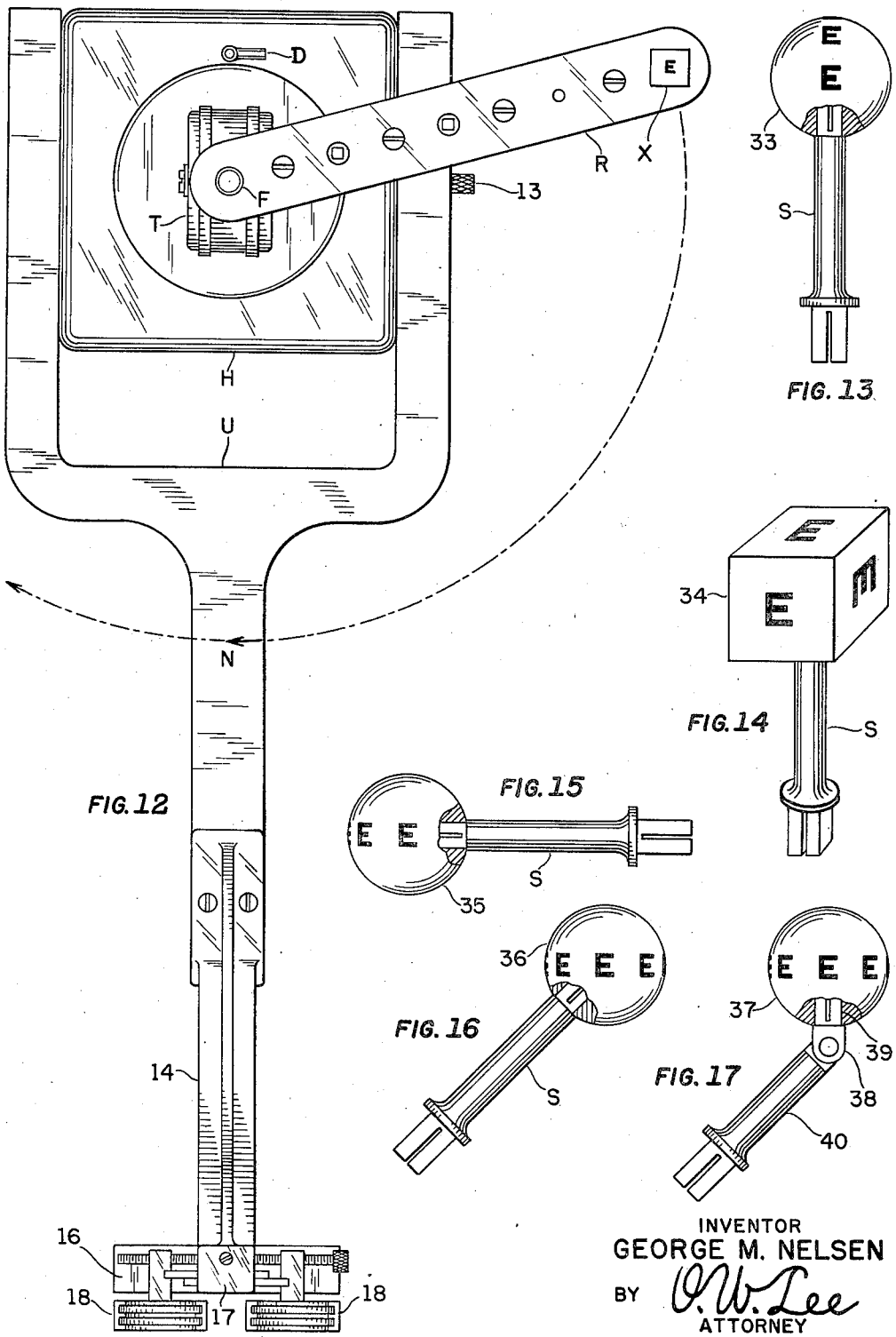
INVENTOR
GEORGE M. NELSEN
BY O. W. Lee
ATTORNEY

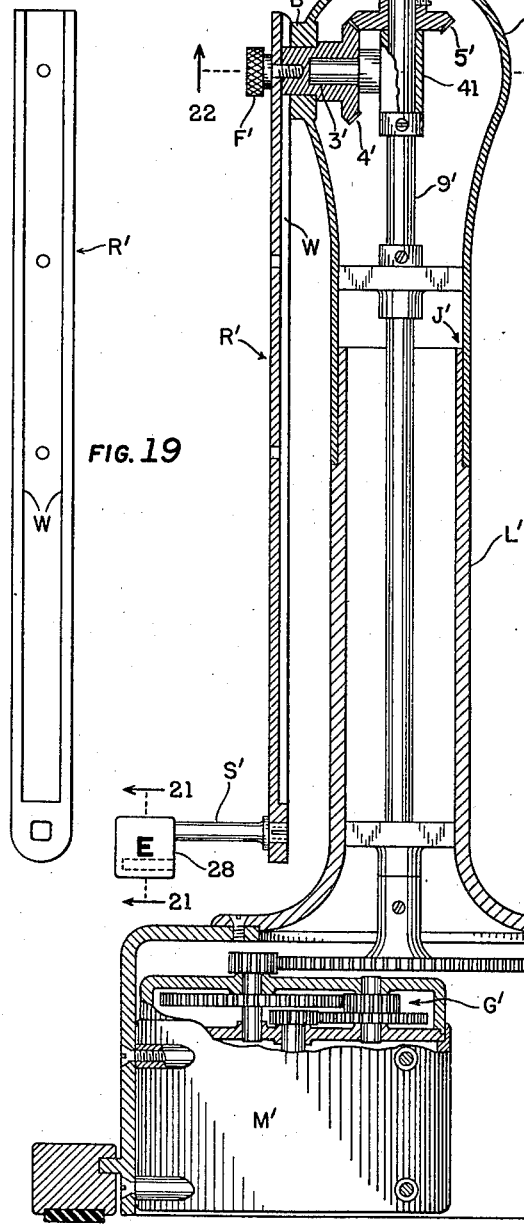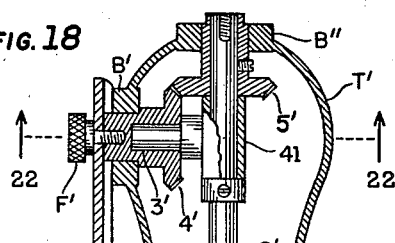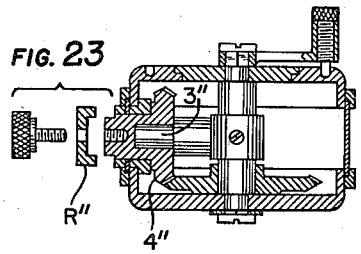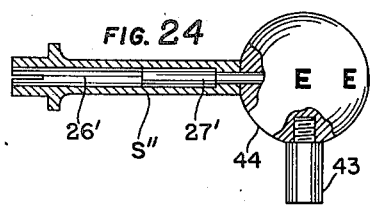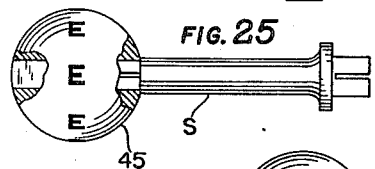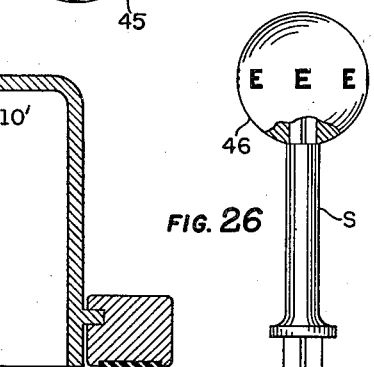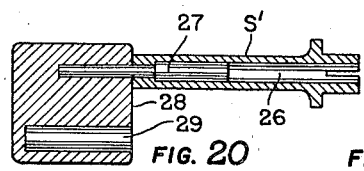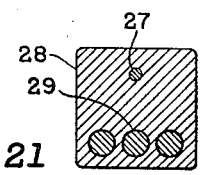

Patented Nov. 6, 1945

2,388,493

UNITED STATES PATENT OFFICE 2,388,493

OPHTHALMIC DEVICE

George M. Nelsen, Seattle, Wash.

Application April 29, 1944, Serial No. 533,346

15 Claims. (Cl. 128—76.5)

The present invention relates to certain new and useful improvements in an ophthalmic device for exercising the intrinsic and extrinsic muscles of the human eye, so as to establish a proper relationship between accommodation and convergence.

It is well known that the involuntary reflexes of accommodation and convergence are so closely associated together that each one affects the other to considerable extent, and any departure from normal in one of them, may establish a disproportionate relationship in these two associated functions. In many instances the disproportionate relationship of these functions becomes so habitual and persistent that it greatly interferes with proper correction of errors of refraction. In prescribing proper glasses to correct errors of refraction, consideration must always be given to any exophoria, or esophoria, and the extent to which the correcting lenses may affect the existing relationship of accommodation and convergence. In many instances, comfortable vision can not be obtained unless the ocular muscles are systematically exercised so as to break up any habitual and disproportionate relation between the accommodation and convergence.

Various devices are in general use for exercising the ocular muscles, and there has long been a widespread general recognition of the consequence and importance of the subject. It is conventional practice, to exercise the ocular muscles by means of a target rotated in a vertical plane at a constant distance from the patient, prisms being used to control the convergence, and minus lenses being used to induce additional accommodation, when required. Much good can be accomplished by this procedure, but inasmuch as the target rotates at a fixed dioptric distance from the patient, the amount of accommodation and convergence is therefore constant during rotation of the target. It is also conventional practice to employ separate rotating targets for each eye and produce binocular fusion by prisms or otherwise, and induce accommodation with minus lenses when required; but in such instances the targets rotate in a vertical plane at a fixed dioptric distance from the patient, and therefore the amount of accommodation and convergence is constant during rotation of the targets.

I have discovered that much better results can be obtained if the target is rotated in a manner so as to approach and recede from the patient and thus afford a continuously variable amount of accommodation and convergence at each rotation of the target, so as to preclude the patient from adopting any fixed amount of accommodation and convergence, and so as to afford a dynamic functioning of the accommodation and convergence under an induced relationship established by prisms and lenses. In this manner there is a variable flexing of the accommodation and convergence at each rotation of the target, as distinguished from mere ocular movements under a fixed amount of accommodation and convergence. This variable flexing makes it possible to break up any habitually disproportionate relation of accommodation and convergence, much more effectively and more promptly than when the target is rotated at a constant distance from the patient.

In carrying out my invention, I provide a horizontal radius arm rotatable about a vertical axis located at a predetermined dioptric distance from the patient, and an ophthalmic target is mounted on a vertical stem carried by this radius arm at a predetermined dioptric distance from the axis of rotation, so that during each rotation of the radius arm, the dioptric distance between the patient and the ophthalmic target will be varied a known dioptric amount, as the circular movement of the target approaches towards and recedes from the patient, thus inducing the patient to continuously vary the amount of accommodation and convergence during each rotation of the target. In this manner, each rotation of the target induces a gradual increase of the accommodation and convergence as the target moves towards the patient, followed by a gradual decrease as the target moves away from the patient to again start the next increasing phase. Thus there is afforded, a known dioptric amount of repeated flexing of the accommodation and convergence, in whatever relationship of accommodation and convergence that may be induced by lenses and prisms.

This systematic flexing of the accommodation and convergence under controlled dioptric relations, is of paramount importance in breaking up any persistent and habitually disproportionate relation of accommodation and convergence, and makes it possible to more promptly and efficiently establish a proper relation of accommodation and convergence which will afford comfortable vision when correct glasses are worn.

To enable the invention to fully suffice for the wide variations of ocular conditions which are encountered in actual practice, I provide means to operate the target at various dioptric distances and I also provide means to operate the radius arm and its target in various vertical planes and various inclined planes, as well as in a horizontal plane, and suitable ophthalmic targets are provided for use when operating the radius arm in each of the various planes and when changing from one plane to another while the radius arm is rotating.

The accompanying drawings show the most complete embodiment that I have thus far devised, and also show the manner in which that embodiment can be simplified, should such be desired for economical practicability.

Fig. 1 is a vertical transverse section through the invention.

Fig. 2 is an underside view of the radius arm, the wall being broken away to expose the planetary gear train.

Fig. 3 is a left side elevation of the turret head shown in Fig. 1.

Fig. 4 is a horizontal section of the turret head, taken along the line 4—4 of Fig. 1.

Fig. 5 shows a target stem with a ball target frictionally engaged therewith.

Fig. 6 is a section taken on the line 6—6 of Fig. 1 and shows the weighted target cube supported upon trunnions.

Fig. 7 is an underside view partly in section, of the trunnion cube, looking in the direction of the arrow 7 of Fig. 1.

Fig. 8 is a vertical section of a similar trunnion cube having a closed front wall.

Fig. 9 is a horizontal section of the lower end of the turret head as indicated by the line 9—9 of Fig. 3.

Fig. 10 shows a short stem with a frictionally engaged ball target having a series of line characters.

Fig. 11 is a side elevation of the invention slidably mounted on a base which is provided with lens holders supported at the level of the target when the radius arm is operated in a horizontal plane, and here the turret head is rotated 90 degrees from the position shown in Fig. 1.

Fig. 12 is a plan view of Fig. 11.

Fig. 13 shows a vertical stem with a ball target having a vertical belt of letters.

Fig. 14 shows a stem with a target cube having letters arranged for use in horizontal and vertical positions of the stem.

Fig. 15 shows a horizontal stem with a ball target having a horizontal belt of letters for use when rotating the turret while the radius arm is operating in a vertical plane.

Fig. 16 shows a stem with a ball target having letters in a horizontal belt when the stem is inclined 45 degrees, for use when rotating the turret while the radius arm is operating at an angle of 45 degrees.

Fig. 17 shows a stem with a hinge joint and a ball target with an equatorial belt of letters, for use in keeping the letters level at any inclination in which the radius arm is set and the letters visible at any required rotation of the turret.

Fig. 18 shows a simplification of Fig. 1 by making the bearing blocks in fixed position, and eliminating the race wheel and the planetary gear train.

Fig. 19 is an underside view of the radius arm shown in Fig. 18.

Fig. 20 is a vertical longitudinal section through the stem and target cube shown in Fig. 18 and discloses the pivotal mounting of the internally weighted cube.

Fig. 21 is a vertical section taken along the line 21—21 of Fig. 18 and shows the manner of weighting the target cube.

Fig. 22 is a horizontal section taken on the line 22—22 of Fig. 18.

Fig. 23 is a horizontal section similar to Fig. 4 showing that embodiment simplified by eliminating the planetary gears and then bolting the radius arm to the hub of the beveled gear.

Fig. 24 shows a horizontal stem having an axial bore in which there is rotatably mounted a pivot which carries an externally weighted ball target having a horizontal belt of letters for use in operating the simplified radius arm in vertical position at any desired rotation of the turret.

Fig. 25 shows a horizontal stem with a frictionally engaged ball target having a vertical belt of letters for use in the position shown in Fig. 18 or the reverse thereof.

Fig. 26 shows a vertical stem with a frictionally engaged ball target having a horizontal belt of letters for use when the simplified radius arm is operated in a horizontal position.

Each of the detail views of the targets are drawn on an enlarged scale so as to approximate actual size in the printed patent, and the same identical stem S is repeatedly shown in the several instances so as to more clearly illustrate the relative arrangement of the ophthalmic characters. It will of course be understood that the various targets can be frictionally engaged with the same stem S.

As shown in Fig. 1, the invention provides a housing H, upon which there is rotatably mounted a turret T which is here shown as having a lower section L connected thereto by a sleeve joint as indicated at J, so that the upper section T can be machined as a separate piece, and also so that this upper section can be rotated around the sleeve joint J if it is desired to make the lower section L rigid with the housing H. In the present instance this lower section L is rotatably mounted in the housing and retained by a ring 11 which is bolted thereto as shown. Any suitable clamp may be used to hold the turret at set rotation, as for instance the screw threaded stem with a brake disc as here shown at D on the right side, but in actual practice is placed at the rear, so as to be more accessible to the operator.

The turret head T has an arcuate dome $d$ which has a broad open slot $e$, in which there is slidably mounted a bearing block B, this slot being here shown with sufficient length to afford a 180 degree movement of this bearing block; however, in some instances a 90 degree movement will suffice, and this slot may be made correspondingly shorter. A cross shaft 2 is journaled concentric with said arcuate dome and slot. Secured to this cross shaft is a stub shaft 3 upon which there is rotatably mounted a beveled gear 4 having its hub journaled in the aforesaid bearing block B so that these parts can be moved in an arc around the axis of this cross shaft 2. Strips 7 and 7' are attached to the bearing block B and extend in opposite directions through paired guideways 8—8 which direct the strips around the turret as the bearing block is moved in the slot, so that these strips cover the slot in any position to which the bearing block may be moved. For convenience in effecting this arcuate movement of the bearing block B, the cross shaft 2 is externally provided with a crank handle C which has a threaded latch pin $f$ selectively engageable with bores such as $b$ provided in the wall of the turret. An intermediate gear 6 is journaled on the cross shaft 2 and meshes with the aforesaid beveled gear 4 so that this intermediate gear serves as a race wheel around which the beveled gear 4 travels during the arcuate movement of the bearing block B. A vertical drive shaft 9 extends from the housing H and into the turret head, and secured to this drive shaft, is a beveled gear 5 which meshes with the aforesaid intermediate gear 6, so that when the turret is rotated, this intermediate gear can swing to various positions around the axis of this drive shaft and remain constantly in mesh with both of the other gears aforesaid.

The drive shaft 9 may be driven in any suitable manner, as for instance, by a motor M having a reduction gear unit G which drives the gear 10 secured to the lower end of the drive shaft 9. The motor M can conveniently be positioned in one corner of the housing H and bolted to two of the walls thereof in the manner indicated, which makes a particularly rigid mounting and enables the bottom of the housing to be left open for ventilation of the motor. This leaves adequate room in the housing for such expedients as a rheostat for controlling the speed of the motor, a reversing switch, and a line switch, if any or all of them be desired, but such well known expedients need not be here shown.

In Fig. 1 there is collectively indicated at R, a radius arm, in which there is journaled a series of planetary gears in straight line formation, nine gears being shown in the present instance so that when these gears have a one inch pitch diameter there will be eight inches between the centers of the first gear P and the ninth gear P' each of which has a square axial bore as best seen in Fig. 2, where it will also be seen that the underside of this radius arm is provided with paired ribs such as V. As shown in Fig. 3, flat sides $h$ are provided on the hub of the aforesaid beveled gear 4, and a squared end $k$ is provided on the stub shaft 3 which is a dead shaft as will be apparent from Fig. 4. In this manner, the radius arm R is keyed to the hub of the beveled gear 4 and the first planetary gear P is keyed to the squared end of the stub shaft 3 so as to hold this gear P from rotating, the screw F being employed to hold the parts in assembled position.

From this description, it will be seen that as the beveled gear 4 rotates the radius arm R, the first planetary gear P being held stationary, the next one which meshes with it will travel around the stationary gear P and thereby turn each alternate gear counterwise so that the ninth gear P' will rotate opposite to the rotation of the radius arm. As shown in Fig. 1 the square bore of this ninth gear P' has a stem S fitted therein and this stem carries an ophthalmic target X, thus it will be seen that the reverse rotation of the gear P' will keep this ophthalmic target facing in the same direction throughout the rotation of the radius arm.

As shown in Figs. 1, 11 and 12, the housing H is mounted on a base which is collectively indicated as U, and as best seen in Fig. 11 where the turret T is rotated 90 degrees from the showing in Fig. 1 and the radius arm R is raised to the horizontal position, there is an upstanding arm 14 mounted on the forward end of the base U, and there is a pair of lens cells 18 carried by this upstanding arm. As shown in Figs. 11 and 12, the paired lens cells 18 are adjustably mounted in a block 17 having a crosshead 16 which is slidably dovetailed into a crosshead 15 provided on the upper end of the upstanding arm 14. If a headrest or a chinrest are desired, they can readily be mounted above and below on this block 17 so as to move therewith, but these broadly old elements need not be here shown. In some instances the crossheads 15 and 16 may be omitted and the block 17 may be rigid with the arm 14.

The lens cells 18 are located at a predetermined distance frowardly of the axis of rotation of the radius arm R, so that as the ophthalmic target X travels in a circular path as indicated by the dot-and-dash arc of Fig. 12, there will be a known dioptric distance between the ophthalmic target X and the lens cells when the target arrives at the nearest position indicated by the arrow at N, and also be a known dioptric distance when the target is directly opposite the position N and farthest from the lens cells; so that the dioptric interval between these two positions can be definitely known, because that dioptric interval is the amount of flexing of the accommodation which is the prime purpose of paramount importance with which the present invention is particularly concerned.

I prefer to mount the device so that the axis of the drive shaft is 20 inches from the lens cells, and to employe a radius arm having the target stem at a distance of 8 inches from the center of rotation of the radius arm, so that the nearest dioptric distance at N will be 12 inches or 3.27 diopters and the farthest dioptric distance will be 28 inches or 1.40 diopters, and the dioptric interval therebetween will be 3.27—1.40 or 1.87 diopters, which is the amount of flexing of the accommodation in this instance. In order to flex the accommodation different amounts, it is advisable to provide some means to alter the distance between the center of rotation and the lens cells; as for instance, the arm 14 may be slidably mounted on the base U, or as here shown, the housing H may be slidably mounted on the base by means of guides and guide ways as indicated at 12 in Fig. 1, and a suitable detent 13 may be provided to latch the housing in three locations to provide a center of rotation at 18 or 20 or 22 inches from the lens cells, suitable click sockets being provided in the housing for the detent to engage.

It will be seen that when the center of rotation is moved to 18 inches, the nearest dioptric distance of the ophthalmic target will be 10 inches or 4.00 diopters and the farthest dioptric distance will be 26 inches or 1.50 diopters and the dioptric interval therebetween will be 4.00—1.50 or 2.50 diopters which is the amount of flexing of the accommodation in this instance, and which is the amount of flexing which normally occurs between infinity and a reading distance of sixteen inches, thus enabling the invention to accomplish that wide range of flexing in a compact device.

In like manner, when the center of rotation is moved to 22 inches the nearest dioptric distance will be 14 inches or 2.81 diopters and the farthest dioptric distance will be 30 inches or 1.31 diopters, and the dioptric interval will be 2.81—1.31 or 1.50 diopters which is the amount of flexing of the accommodation in this instance; and it will be noted that a change of only four inches in the center of rotation, affords a 1.00 diopter difference in the dioptric interval as compared with the immediately preceeding paragraph. It will also be noted that the two above stated dioptric values 2.81D and 1.31D are not such divisions in which ophthalmic lenses are usually made, but the resulting dioptric difference of 1.50D is a conventional lens value. The hereinbefore stated 8 inch length of radius arm and the center of rotation at 18, 20 and 22 inches has been adopted so that in each instance, the dioptric interval will be a dioptric value conventionally used in ophthalmic lenses. This greatly adds to the convenience in interpreting the results, and is also of advantage when supplemental lenses are used to alter the total amount of accommodation.

As thus far explained, it will be seen that with the center of rotation at 18, 20 and 22 inches, the accommodation is flexed 1.50D, 1.87D, or 2.50D depending upon which center of rotation is employed. In any instance, the convergence is of course flexed a corresponding multiple of the dioptric interval, and as those skilled in ocular myology well know that the amount of the multiple is determined by the interpupillary distance of the patient, it is needless to here set forth the mathematics of that equation. Since with each patient, that multiple is a known constant, it is fully sufficient to here consider only the flexing of the accommodation. The amount of flexing which can be accomplished is dependent upon the amount of accommodation which the patient possesses and also upon the alertness with which the accommodation responds to the stimulus of vision when the patient attentively observes the ophthalmic target during its travel in the circular path, towards and away from the lens cells. Where the accommodation is sluggish, the invention may be employed in systematic exercises to gradually promote an alertness of accommodative response to stimulus.

The invention, enables exophoria and esophoria to be altered by systematic flexing of the accommodation under whatever relationship of accommodation and convergence that may be clinically indicated. During the exercising, the convergence may be controlled with prisms in the well known manner, and additional accommodation may be induced by appropriately selected minus lenses, or where the amplitude of accommodation is low, the accommodation may be assisted by appropriately selected plus lenses, care being exercised not to produce a far point which is nearer than the farthest distance of the ophthalmic target. The invention enables any persistent and habitual relationship of accommodation and convergence to be broken up by systematic flexing of the accommodation under an induced relationship of accommodation and convergence which is antagonistic to the habitual relationship; and in this way, a proper relationship of accommodation and convergence can gradually be induced and will become the established function, replacing the former habitual relationship.

Where the patient has an alert accommodation of sufficient amplitude, the ophthalmic target may be a plain ball of some suitable color such as red, green, blue, yellow, or white. Inasmuch as an ophthalmic character affords a better stimulus to accommodation than does a plain ball, I have provided a complete system of targets with ophthalmic characters arranged so as to be serviceable in the various planes in which the radius arm is rotated and in the various positions to which the turret is turned, and also in changing from one plane to another while the radius arm is being rotated.

Due to the presence of the planetary gears in Fig. 1, a cube fixed to the stem S will remain faced in the same direction throughout the rotation of the radius arm in that vertical plane; but when the bearing block is moved 90 degrees to position the radius arm horizontal, then the arms of the illustrated letter E will be directed downward and it would be necessary to use a different face of the cube having a letter positioned as shown on the front face of Fig. 14; and when the bearing block is moved so as to position the radius arm in a vertical plane on the right side, then the illustrated E of Fig. 1 would be backwards, and it would be necessary to use a different face of the cube having the arms of the letter E directed outwardly from the stem instead of inwardly as shown in Fig. 1.

To avoid using a different face of the cube in each of these three instances, the target X of Fig. 1 is internally supported upon trunnions and weighted so as to lower its center of gravity and thus keep the cube vertical in all positions of the radius arm. As seen in Figs. 6 and 7 this target cube X has a deep channel Y cut in its underside, and bearing slots Z are provided for the reception of trunnions 21 which are carried by an adapter head 22 which is frictionally engaged with the stem S which preferably has a square end, as is shown in Fig. 6. The bottom of the cube is loaded on each side by weights such as 23 so as to lower the center of gravity and keep the cube erect upon the trunnions. To further enhance the effect of the weights, the upper part of the cube is provided with two bores such as 24 which suffice to further lower the center of gravity, and also provide a convenient mode for originally balancing the cube to level position, which can be quickly and easily accomplished by reaming out one end of either or both of these bores so as to lighten the cube on whichever side happens to be low.

When this weighted target cube, balanced upon its trunnions, is used in Fig. 1, the planetary gears will keep the trunnions level during rotation of the radius arm in any plane and the bearing block B can be moved throughout the 180 degrees without disturbing this target cube X, and without stopping the rotation of the radius arm while changing to a different plane of rotation. This is of considerable advantage when wide excursions of the radius arm are desired.

In Fig. 1, if the turret is rotated 90 degrees so as to operate the radius arm in a vertical plane parallel to the line of section, then the open end of the channel Y would be towards the observer; for which reason I provide the target cube of Fig. 8 which is the same as just described except that it has a front wall 25 which is the exposed side in this instance and can have an ophthalmic character thereon. This target cube will remain level on the aforesaid trunnions throughout rotation of the radius arm in this vertical plane which does not require any flexing of the accommodation, and will also remain level when the bearing block B is moved so as to gradually change the plane of rotation to the horizontal position which affords flexing of the accommodation. This gradual shift, from a non-flexing plane, to a flexing plane, while the radius arm is constantly rotating, is of real advantage when the patient has a sluggish accommodation which responds slowly to stimulus. In such instances, the presence of an ophthalmic character such as a small letter E is of considerable advantage, as it affords a better stimulus than a plain unlettered target.

With this target of Fig. 8 raised from operating in the vertical plane to operating in a horizontal plane, it is then possible to rotate the turret 90 degrees in either direction, and then lower the radius arm to the vertical position shown in Fig. 1 or else to a similar position on the right side, in which instance the target cube can be provided with an ophthalmic character on its two side faces as well as on the front face, the letter on one side face being the same as shown in Fig. 1 and the one on the opposite side having the prongs of the E directed outwardly from the stem S. Thus it will be seen, that if the movement of the bearing block B is limited to 90 degrees, then the target cube of Fig. 8 will be more serviceable than the target cube of Figs. 6 and 7.

Changing from the non-flexing vertical plane to the flexing horizontal plane is of such consequence and importance that I have also provided the target shown in Fig. 13 where the stem S is vertical and the target 33 is a ball having a vertical belt of three ophthalmic characters as illustrated, the first and second characters being readily visible, and there is a third character on the zenith but barely showing in this position as it is for observation when the radius arm is operating in the non-flexing vertical plane with the target stem directed horizontally forward. It will be seen that when the radius arm is in a horizontal plane, this target can be positioned on the stem S with the belt of ophthalmic characters facing forward, whereupon the planetary gears will maintain them forward during rotation of the radius arm; and when the radius arm is gradually lowered to the non-flexing vertical plane, the first character will gradually pass out of direct position and the second character will come into direct position, then the third character will gradually come into directly forward position at the non-flexing vertical plane of the radius arm. Conversely, the radius arm can be gradually raised from the non-flexing vertical plane, to the flexing horizontal plane, while the radius arm is rotating, and one or more of the characters will be in plain view at all times, so as to afford a criterion for determining whether the accommodation is flexing in the intended manner, and thus enable the operator to know how gradual the plane of operation must be changed. Of course it is understood that any blurring of the ophthalmic characters is evidence that the flexing of the accommodation is insufficient for the existing conditions, and therefore the plane of rotation will have to be kept within the capacity of the patient, or else the accommodation-convergence relation will have to be altered by lenses or prisms or both, so as to afford a better flexing response; and then subsequently, after the flexing becomes more alert, it will be possible to gradually alter the accommodation-convergence relation by lenses and prisms, according to requirements and of course within the capacity of the patient.

Transition from non-flexing to flexing, can also be accomplished by the target shown in Fig. 15 where the stem S is horizontal in the target 35 is a ball, having a horizontal belt of ophthalmic characters, two of which are readily visible and a third barely shows, and there can readily be two more on the opposite side. It will be seen that when this target 35 is used with the radius arm in the vertical plane as shown in Fig. 1, the planetary gears will maintain the belt of ophthalmic characters horizontal and in the same direction during rotation of the radius arm; and then the turret can be gradually rotated 90 degrees so as to operate the radius arm in the non-flexing vertical plane, and it will be seen that one or more of the ophthalmic characters are visible throughout this 90 degree rotation of the turret. Conversely, the turret can be rotated so as to afford a gradual transition from the non-flexing vertical plane, to the flexing vertical plane shown in Fig. 1; and for this purpose, it is advisable to first slidably move the lens cells 18 so that they will center with the plane of the radius arm in the position shown in Fig. 1 and thus avoid having the underside of the radius arm come into view. It should be noted that in the vertical plane shown in Fig. 1, the flexing is not accompanied by any lateral movements of the eyes; but in the horizontal plane, the flexing is accompanied by lateral movements of the eyes.

As yet I have not collected sufficient clinical data to enable me to state with assurance which mode of transition is the most feasible. However, I consider the transition from the non-flexing vertical plane to the flexing horizontal plane, to be the most convenient, and I wish it to be understood that I may make the turret rigid in the position for that purpose, and employ only a 90 degree movement of the bearing block B, and in the forward arc only, in which case the block 17 for the lens cells may be rigid with the arm 14.

Also I may omit the arcuate slot and slidably mounted bearing B and eliminate operation in the horizontal plane, and rely solely on rotation of the turret for operation in various vertical planes, and may perhaps restrict the rotation of the turret to 90 degrees. The complete embodiment as here disclosed has been devised to meet all possible requirements, and I wish it to be understood that I contemplate other embodiments which will be simplified by omitting some of the expedients shown in this complete embodiment.

For operating the radius arm in a plane inclined 45 degrees, I provide the target shown in Fig. 16 where the stem S is inclined 45 degrees and the target 36 is a ball having a belt of ophthalmic characters which are level when the stem is inclined 45 degrees. When this target 36 is used on Fig. 1 the planetary gears will maintain the belt of ophthalmic characters level during rotation of the radius arm in any 45 degree plane, and the turret can be rotated to various positions while the radius arm is rotating, and the belt of ophthalmic characters will remain level in all positions of the turret, and the various ophthalmic characters will successively come into view as the turret is rotated. Here it should be noted that when the 45 degree plane is forwardly inclined towards the lens cells, the ophthalmic target appears to travel in an elliptical path having its short axis in the direction of observation and there is an interval of only about 11¼ inches between the farthest and nearest positions of the target, and hence less flexing than when the radius arm is operated in a horizontal plane. When the 45 degree plane is laterally inclined, the target appears to travel in an elliptical path having its long axis in the direction of observation, and therefore the amount of flexing is the same as in the horizontal plane, but there is less lateral movement. By gradually rotating the turret while the radius arm is rotating in a 45 degree plane, there is provided a gradual transition through various 45 degree planes, each affording a different amount of flexing. This provides another mode of procedure in instances where the accommodation is limited, or the reflex response sluggish.

For similar purposes, I also provide the target shown in Fig. 17 where the stem 40 is provided with a friction hinge joint as indicated at 38, so that the end 39 can be positioned vertical at any required inclination of the stem 40. Frictionally engaged with the hinged end 39, is a ball target 37 having an equatorial belt of ophthalmic characters, which can be positioned level at any required inclination of the stem; and when this target and stem are used on Fig. 1, the planetary gears will maintain the target level during rotation of the radius arm. This provides for rotating the radius arm in variously inclined planes, and of course this hinged stem is also serviceable in vertical and horizontal positions. Any of the previously described targets may be frictionally engaged with this hinged stem and operated the same manner as hereinbefore described for each respective target.

Ophthalmic characters, other than letters may be employed; as for instance, Fig. 10 shows a short stem 31 frictionally engaged with a ball target 30 having an equatorial belt of ophthalmic characters 32 consisting of an endless series of short lines and narrow gaps. The narrow gaps have sufficient width to be readily visible in the central area, but the curvature of the ball causes the gaps to appear progressively narrowed when outside the central area. This affords a satisfactory ophthalmic target, and of course the belt of characters can be variously located, the same as in Fig. 13, 15, or 16. The short stem 31 is serviceable when the radius arm is operated in the flexing vertical plane of Fig. 1 and the lens cells 18 centered with the plane of rotation, because the short stem positions the target nearer to the plane of rotation. In such instances, this short stem may be used either with a cube target or else with a ball target.

Fig. 14 shows a vertical stem S with a cube target 34, having on each of its four faces, an ophthalmic target consisting of a small letter E appropriately positioned. The front face of the cube is shown with the letter E positioned for use when the stem is vertical and the radius arm operated in a horizontal plane. The right face shows the letter E positioned for use when the stem is horizontal in the position shown in Fig. 1. The opposite unseen face may have the letter E positioned the reverse of that shown in Fig. 1. The top of the cube 34 is shown with the letter E in position for use when the stem is directed horizontally forward for operating the radius arm in the non-flexing vertical plane. Thus, this target cube 34 has four different ophthalmic targets so positioned that it is unnecessary to change the position of the cube upon the stem when operating the radius arm in any of these four different planes.

Sheet 4 of the drawings show such simplifications as I have thus far devised, and it will be understood, that I may make further simplifications.

Fig 18 eliminates the previously described arcuate slot and also omits the intermediate gear, so that here the gears 4' and 5' engage directly with each other. A collar 41 is rotatably mounted on the vertical drive shaft 9', and the stub shaft 3' is rigid with this collar 41. The beveled gear 4' is rotatably mounted on this stub shaft 3', and also has its hub journaled in a bearing block B' which is rigid with the turret T'. The beveled gear 5' is secured to the drive shaft 9', and the hub of this gear is journaled in a bearing block B'' which is rigid with the turret. The hubs of each of these gears extend externally from the bearing blocks, and have flat sides h' the same as previously described. The radius arm R'' is a simple bar with longitudinal ribs W' which are shown engaged with the aforesaid flat sides on the hub of the gear 4' and held in assembled relation by the screw F' which is threaded into the solid end of this hub. A stem S' is mounted on the free end of this radius arm, and an ophthalmic target 28 is carried by this stem. The turret is provided with a sleeve joint J' the same as previously described, but here the lower section L' is rigid with the housing. The motor M', the reduction gearing G', and the gear 10' are the same as previously described.

The planetary gears are eliminated from the radius arm R'; and as shown in Figs. 20 and 21, the target stem S' has a stepped axial bore 26 in which a stepped pivot 27 is rotatably mounted, and the outer end of this pivot is secured in the target cube 28, as for instance by a driven fit, and is somewhat above the center of the cube. The lower part of the cube is weighted as illustrated at 29, so as to lower the center of gravity and keep the target cube vertical during rotation of the radius arm in the vertical plane. This target cube may have an ophthalmic character on three of its faces so as to operate in a flexing vertical plane at either the right or the left, and also in the previously described non-flexing vertical plane.

To provide a gradual transition between vertical planes, I provide the ophthalmic target shown in Fig. 24, where the stem S'' has a stepped axial bore 26' in which the stepped pivot 27' is rotatably mounted, and the outer end of this pivot is secured diametrically in the ball target 44 which is externally loaded by a weight 43. This ball target 44 has a horizontal belt of ophthalmic characters the same as provided in Fig. 15 and previously described. When this target 44 is used on the radius arm of Fig. 18, the weight 43 will keep the belt of characters level during rotation of the radius arm in any vertical plane, and when the turret is gradually rotated to the non-flexing vertical plane the ophthalmic characters will successively come into direct view.

For operation in the vertical plane illustrated in Fig. 18, I also provide the target of Fig. 25 where the stem S is horizontal, and the target 45 is a ball having a vertical belt of ophthalmic characters equally spaced all the way around the ball, as for instance, eight letters in the complete belt. It will be realized that these letters will successively come into direct view as the radius arm is rotated in this flexing vertical plane, and the target can be reversed on the stem whenever the radius arm is rotated in a vertical plane on the right side.

For operating the radius arm in a horizontal plane, I provide the target shown in Fig. 26 where the stem S is vertical and the target 46 is a ball having a horizontal belt of ophthalmic characters equally spaced all the way around the ball, as for instance, eight characters in the complete belt. It will be realized that these characters will successively come into direct view when the radius arm is rotated in a horizontal plane. It should also be noted that this target 46 can be used on Fig. 1 with the radius arm in a horizontal plane, and then the planetary gears will keep each of the eight ophthalmic characters facing in a constant direction during rotation of the radius arm, so that eight patients can be situated in a circle around the axis of rotation and each one can observe the same respective letter throughout the rotation of the radius arm. This is of utmost advantage in handling large groups of school children, eight at a time, in which case the housing is removed from the base and secured in the center of a round table 40 inches in diameter, and there will be adequate room for eight children to be seated at equally spaced positions around the table. In such instances, one person can superintend them all, and keep them diligent and silent so as not to disturb each other.

Fig. 23 shows a section similar to Fig. 4 where that embodiment is simplified by omitting the planetary gears; and the stub shaft 3″ is made shorter, and the beveled gear 4″ has a solid end on its hub to which the radius arm R″ is keyed and secured by a screw, in the same manner as described under Fig. 18, this being the same radius arm as shown in Figs. 18 and 19. This turret head of Fig. 23 can be used on either Fig. 1 or Fig. 18; and of course the pivoted target cube 28 shown in Fig. 20 can be used in the previously described manner, and so can the ball target 45 shown in Fig. 25. For transition from the non-flexing vertical plane to the flexing horizontal plane, an unlettered ball target is employed, as I have not yet devised any arrangement of ophthalmic characters suitable for that purpose when the planetary gears are omitted. For gradual transition from the non-flexing vertical plane to a flexing vertical plane, the pivoted ball target 44 shown in Fig. 24, is used in the previously described manner. The ball target 30 shown in Fig. 10 can be used when the radius arm is operated in any laterally inclined plane, with the lens cells shifted to center with the plane of rotation as before explained, and it is also serviceable when the radius arm is operated in a flexing vertical plane, or in the horizontal plane; and when this ball target 30 is placed on the longer stem S, it can be used for gradual transition from a flexing vertical plane, to the horizontal plane. When the radius arm is operated in the horizontal plane, the ball target 46 shown in Fig. 26 can be used, and the letters will successively come into direct view as the radius arm is rotated, and the several letters will be seen in succession in about the same manner as reading a line of letters on a printed page. That is to say, that the fixation skips from one letter to another, just like in reading. It will of course be understood that the radius arm is rotated at a slow speed, of say 30 R. P. M. or less. Here too, this ball target 46 of Fig. 26 can be used for group operation with eight school children, as before explained.

It will be seen, that the number of ophthalmic targets required will depend upon what embodiment of the invention is employed, and upon the procedure to be followed. In any instance, two or three targets with appropriate ophthalmic characters will suffice, and it is advisable to also provide an unlettered ball target for operating the radius arm in different planes indiscriminately.

To make the matter of targets more clear, it is pointed out that when the embodiment of Fig. 1 is restricted to a 90 degree arcuate movement of the bearing block B, then the target cube of Fig. 8 will suffice for all purposes except transitions which require gradual rotation of the turret, and instead, the turret is alternately set at fixed position to operate in the non-flexing vertical plane, or else in a flexing vertical plane at either the right or the left, and in any such instance, a gradual transition to the horizontal plane can be accomplished by a 90 degree movement of the bearing block B. This affords the preferred transition from the non-flexing vertical plane to the flexing horizontal plane and is fully sufficient for all practical purposes, so it will be seen that this one target cube and an unlettered ball target for use in various planes indiscriminately, would be all that is essentially necessary, unless intended for operation for a group of eight school children, in which instance, the ball target 46 of Fig. 26 would also be supplied.

The targets of Figs. 6, 7, 8, 13, 14, 15, 16 and 17 are serviceable only when the planetary gears are employed, and of course are not used in any embodiment which does not include the planetary gears. Conversely, the pivoted targets of Figs. 20, 21 and 24 are used in the absence of the planetary gears and need not be used when the planetary gears are employed. In like manner the ball target of Fig. 25 need not be used when the planetary gears are employed, and the same is true of the ball target of Fig. 10. The ball target of Fig. 26 can be used either with or without the planetary gears, as has been previously described; and when the radius arm is to be operated only in the flexing horizontal plane, then the ball target of Fig. 26 is the only one actually required. Thus it will be seen, that when any one of the disclosed embodiments is adopted, then the number of targets may be one or more, depending upon requirements.

It will be noted that in Fig. 1 and Fig. 2, the first, third and fifth of the planetary gears have a square axial bore, so that the radial movement of the target can be set at either 4 inches, or 6 inches, as well as at 8 inches; and like facilities are also provided in the simplified radius arm of Figs. 18 and 19. This is done to afford different dioptric intervals at any given distance between the center of rotation and the lens cells; as for instance, when the center of rotation is at 22 inches and the length of radius is 4 inches, the dioptric interval is only .62 diopter, and this can be increased to .87 diopter by moving the center of rotation to 20 inches; and there will be a further increase to 1.12 diopters when the center of rotation is moved to 18 inches. This same dioptric interval of 1.12 diopters can also be obtained by changing the length of radius to 6 inches and moving the center of rotation to 22 inches; and then the dioptric interval can be further increased to 1.25 diopters by moving the center of rotation to 20 inches; and at 18 inches there will be an increase to 1.62 diopters, which latter amount is within the range of the 8 inch radius, which as previously explained, provides dioptric intervals of 1.50D, 1.87D and 2.50D at the three different distances of the center of rotation. Thus it will be seen that various ways are provided for altering the amount of flexing of the accommodation, and that the previously described gradual transition from the non-flexing plane, to a flexing plane, is only one of the ways for accomplishing a variation in the amount of flexing. Thus it will be seen that the herein described simplifications do not sacrifice the possibility of altering the amount of flexing, but merely alter the manner in which it is accomplished.

It is also possible to omit the described base U, and then mount the housing H on a bracket at the conventional ophthalmic chair, so as to employ the well known phoropter instead of the lens cells here illustrated. Such phoropters are in widespread general use on brackets at the ophthalmic chair and are conventionally provided with a graduated bar swingingly mounted in a horizontal plane, and therefore that graduated bar can be conveniently employed to locate the center of rotation at the required distance from the phoropter, whereupon the graduated bar can be swung aside and out of the way.

The various embodiments herein disclosed, are intended as practical examples of the scope of my invention and are not to be construed in a limiting sense.

The invention can also be used for training the color sense, and also for stimulating the peripheral margin vision, but the technic for such procedures need not be here explained.

In the present disclosure, I claim as my invention:

1. An ophthalmic device comprising a housing, a turret rising above said housing and rotatably mounted thereon for rotation relative to said housing, a drive shaft extending from said housing and into said turret and journaled coaxially with the axis of rotation of said turret, gearing within said turret and driven by said shaft, one of said gears having a journal extending laterally through the wall of said turret, a radius arm keyed to said journal, an ophthalmic target upon a stem carried by said radius arm for movement in a circular path at various positions of rotation of said turret, and a motor geared to the lower end of said shaft.

2. An ophthalmic device comprising a housing, a rotatably mounted turret rising above said housing, said turret having an arcuate dome with a slot therethrough, a bearing block slidably mounted in said slot, a beveled gear having a journal mounted in said bearing block, a radius arm keyed to said journal, a series of planetary gears journaled in said radius arm, a cross shaft concentric with said arcuate dome and slot, a stub shaft mounted upon said cross shaft and extending through said beveled gear and keyed to one of said planetary gears, an ophthalmic target upon a stem keyed to one of said planetary gears, an intermediate gear upon said cross shaft and meshing with said beveled gear, a drive shaft extending from said housing and into said turret, a beveled gear fixed to the upper end of said drive shaft and meshing with said intermediate gear, a motor geared to the lower end of said drive shaft, and means to move said bearing block around the axis of said cross shaft to thereby position said radius arm in different planes of rotation.

3. An ophthalmic device comprising a rotatably mounted turret, said turret having an arcuate dome with a slot therethrough, a bearing block slidably mounted in said slot, a cross shaft concentric with said arcuate dome and slot, a stub shaft mounted upon said cross shaft, a beveled gear rotatably mounted on said stub shaft and having a journal mounted in said bearing block, a radius arm keyed to said journal, an ophthalmic target upon a stem carried by said radius arm, an intermediate gear upon said cross shaft and meshing with said beveled gear, a vertical drive shaft, a beveled gear fixed to said drive shaft and meshing with said intermediate gear, and means to move said bearing block around the axis of said cross shaft to thereby position said radius arm in different planes of rotation.

4. An ophthalmic device comprising a turret having an arcuate dome with a slot therethrough, a bearing block slidably mounted in said slot, a cross shaft concentric with said arcuate dome and slot, a stub shaft mounted upon said cross shaft, a beveled gear rotatably mounted on said stub shaft and having a journal mounted in said bearing block, a radius arm keyed to said journal, an ophthalmic target upon a stem carried by said radius arm, an intermediate gear upon said cross shaft and meshing with said beveled gear, a drive shaft, a beveled gear fixed to said drive shaft and meshing with said intermediate gear, and means to move said bearing block around the axis of said cross shaft to thereby position said radius arm in different planes of rotation.

5. An ophthalmic device comprising a housing, a turret rising above said housing, said turret having an arcuate dome with a slot therethrough, a bearing block slidably mounted in said slot, a beveled gear having a journal mounted in said bearing block, a radius arm keyed to said journal, a series of planetary gears journaled in said radius arm, a cross shaft concentric with said arcuate dome and slot, a stub shaft mounted upon said cross shaft and extending through said beveled gear and keyed to one of said planetary gears, an ophthalmic target upon a stem keyed to one of said planetary gears, an intermediate gear upon said cross shaft and meshing with said beveled gear, a drive shaft extending from said housing and into said turret, a beveled gear fixed to the upper end of said drive shaft and meshing with said intermediate gear, a motor geared to the lower end of said drive shaft, and means to move said bearing block around the axis of said cross shaft to thereby position said radius arm in different planes of rotation.

6. An ophthalmic device comprising a longitudinal base having at one end an upstanding arm carrying a pair of lens cells, a housing mounted upon the other end of said base, a rotatably mounted turret rising from said housing, said turret having an arcuate dome with a slot therethrough, a bearing block slidably mounted in said slot, a cross shaft concentric with said arcuate dome and slot, a stub shaft mounted upon said cross shaft, a beveled gear rotatably mounted on said stub shaft and having a journal mounted in said bearing block, a radius arm keyed to said journal, an ophthalmic target upon a stem carried by said radius arm, an intermediate gear upon said cross shaft and meshing with said beveled gear, a vertical drive shaft extending from said housing and into said turret, a motor geared to the lower end of said drive shaft, a beveled gear fixed to the upper end of said drive shaft and meshing with said intermediate gear, and means to move said bearing block around the axis of said cross shaft to thereby position said radius arm in different planes of rotation, whereby said radius arm can be rotated in various planes longitudinally of said base and with substantially uniform differential of the variations of the dioptric interval between said target and said lens cells, and whereby said radius arm can be positioned to rotate in a vertical plane transversely normal to said base and at a constant dioptric interval from said lens cells.

7. An ophthalmic device comprising a housing, a turret rising from said housing, said turret having an arcuate dome with a slot therethrough, a bearing block slidably mounted in said slot, a cross shaft concentric with said arcuate dome and slot, a stub shaft mounted upon said cross shaft, a beveled gear rotatably mounted on said stub shaft and having a journal mounted in said bearing block, a radius arm keyed to said journal, an ophthalmic target upon a stem carried by said radius arm, an intermediate gear upon said cross shaft and meshing with said beveled gear, a vertical drive shaft extending from said housing and into said turret, a motor geared to the lower end of said drive shaft, a beveled gear fixed to the upper end of said drive shaft and meshing with said intermediate gear, means to move said bearing block around the axis of said cross shaft to thereby position said radius arm in different planes of rotation, and a pair of lens cells supported at a predetermined distance from said drive shaft.

8. An ophthalmic device comprising a housing, a turret rising above said housing, said turret having an arcuate dome with a slot therethrough, a bearing block slidably mounted in said slot, a beveled gear having a journal mounted in said bearing block, a radius arm keyed to said journal, a series of planetary gears journaled in said radius arm, a cross shaft concentric with said arcuate dome and slot, a stub shaft mounted upon said cross shaft and extending through said beveled gear and keyed to one of said planetary gears, an ophthalmic target upon a stem keyed to one of said planetary gears, an intermediate gear upon said cross shaft and meshing with said beveled gear, a drive shaft extending from said housing and into said turret, a beveled gear fixed to the upper end of said drive shaft and meshing with said intermediate gear, a motor geared to the lower end of said drive shaft, means to move said bearing block around the axis of said cross shaft to thereby position said radius arm in different planes of rotation, and a pair of lens cells supported at a predetermined distance from said drive shaft.

9. A device as defined in claim 1, wherein said ophthalmic target is carried by a pivot mounted longitudinally of said stem, said target being weighted to lower its center of gravity and keep the target in pendant position during the rotation of said radius arm in a vertical plane.

10. A device as defined in claim 1 wherein said ophthalmic target is carried by a pivot mounted longitudinally of said stem, said target being weighted to lower its center of gravity and keep the target in pendant position during the rotation of said radius arm in a vertical plane, said target being a ball having a horizontal belt of ophthalmic characters for observation when said turret is rotated to different positions during the rotation of said radius arm.

11. A device as defined in claim 1 wherein said ophthalmic target is a ball having a vertical belt of ophthalmic characters for serial observation during rotation of said radius arm in a vertical plane extending in the direction of an observer.

12. A device as defined in claim 2 wherein said ophthalmic target is a ball having a horizontal belt of ophthalmic characters for observation when said radius arm is rotated in a vertical plane, whereupon said ophthalmic characters will remain horizontal at any position of rotation of said turret while said radius arm is being rotated.

13. A device as defined in claim 2 wherein said stem is provided with a friction hinge joint and said ophthalmic target is mounted on the hinged end of the stem so as to be turned to a level position at different inclinations of the radius arm and stem, whereupon said target will remain level at different rotations of said turret while said radius arm is being rotated.

14. A device as defined in claim 8 wherein the ophthalmic target is a channelled cube having internal bearings supported upon trunnions disposed transverse of said stem, a weight in the lower part of said cube to lower the center of gravity and keep the cube vertical upon the trunnions at various inclinations of the radius arm and stem.

15. A device as defined in claim 8 wherein said target is a ball having a vertical belt of ophthalmic characters for observation when said stub shaft is directed towards said lens cells so as to rotate said radius arm in a vertical plane parallel to said lens cells, whereupon said belt of ophthalmic characters will remain vertical and faced in the same direction during the rotation of said radius arm and during movement of said stub shaft to vertical position with said radius arm rotating in a horizontal plane.

GEORGE M. NELSEN.